April 30, 1935.  G. R. CUNNINGTON  1,999,536

TRACTOR LUG

Filed Nov. 3, 1932

INVENTOR
George R. Cunnington
BY Evans & McCoy
ATTORNEYS

Patented Apr. 30, 1935

1,999,536

UNITED STATES PATENT OFFICE 1,999,536

TRACTOR LUG

George R. Cunnington, Akron, Ohio, assignor to The General Tire & Rubber Company, Akron, Ohio, a corporation of Ohio Application November 3, 1932, Serial No. 640,917

3 Claims. (Cl. 301—44)

This invention relates to an improved form of protective lug adapted to be secured over a tractor spade, and more particularly to a cushioning lug of rubber composition providing a relatively large, road-engaging, tractive area for use on tractors operating only occasionally in soft ground, such as in road grading and the like. The present application comprises an improvement over my copending application, Serial No. 640,755 for Tractor lug, filed November 2, 1932.

One of the objects of the present invention is to provide an improved form of protective lug adapted to provide a large supporting area of contact and preventing injury to an improved road surface upon which the tractor may be used and to provide ample traction when operating in soft ground.

Another object is to provide a protective tractor lug having a more or less cylindrical end portion adapted to provide maximum support on hard surfaced roads while retaining the tractor spade characteristics in soft or muddy ground. The proposed form of tractor lug also cleans itself upon leaving muddy soil.

Another object is to provide an internally reinforced lug having enlarged road contact area and wherein the driving stresses are well distributed to prevent the separation of the internally disposed metal stress distributing element from a rubber body portion vulcanized thereto and providing for a uniform rate of wear over all road contacting parts of the lug.

An additional object is to provide an internally reinforced lug having a road contacting portion which initially presents a substantially cylindrical rolling face to the roadway instead of the forward sliding contact made by the end of an uncovered tractor spade.

Another object is to provide a protective rubber lug enclosing a stress distributing element provided with an expanded road contacting portion adapted to amply support the weight of a tractor through a rubber body portion of substantially uniform thickness along lines of force substantially normal to the surface of the stress distributing element for all operative positions of the lug.

With the above and other objects in view, which will be apparent from the following detailed description, the present invention may be said to consist in certain features of construction and combination of parts which will be readily understood by those skilled in the art to which this invention appertains.

In the drawing, which illustrates a suitable embodiment of the invention,

Figure 1:
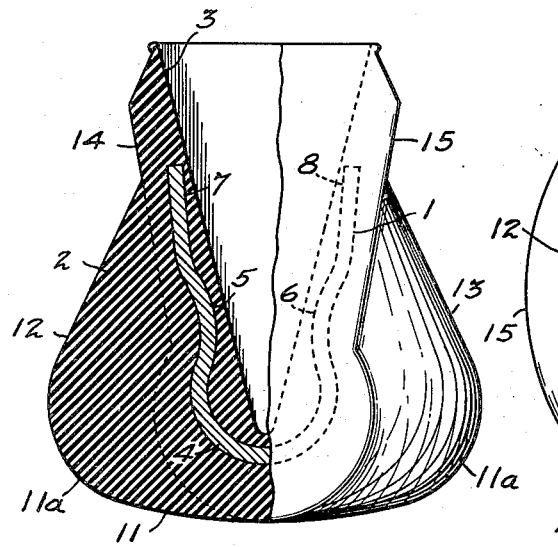
Figure 1 is an end elevational view, partly cut away, of one form of improved tractor lug embodying the invention.
Figure 2:
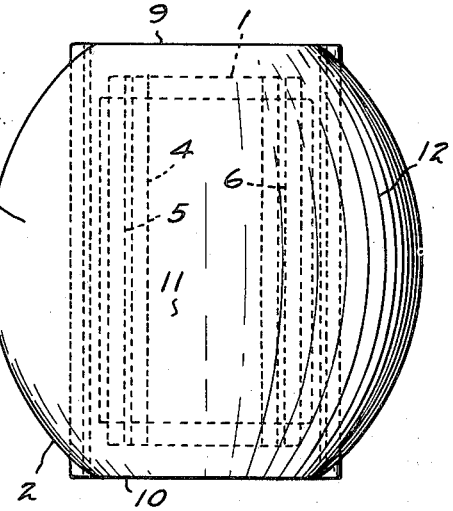
Fig. 2 is a bottom view looking upwardly from below the tractor lug shown in Fig. 1.

The form of cushioning lug shown in Figs. 1 and 2 of the accompanying drawing in Fig. 1 as in its road engaging position comprises a stress-distributing insert 1 and a body portion 2 shaped to provide a suitable aperture 3 for the reception of a tractor spade. The insert 1 is preferably formed of metal of suitable strength, such as sheet steel, that is preferably plated with brass to bond the rubber body portion securely to the insert.

The metal insert 1 comprises, preferably, a substantially cylindrical portion 4 formed continuously with curved portions 5 and 6 interposed between the cylindrical portion 4 and a pair of slightly flared side portions 7 and 8.

The body portion 2 preferably comprises flat, lateral end portions 9 and 10, an enlarged arcuate road-engaging portion 11 that terminates upwardly in transversely arcuate side portions 12 and 13 spaced upon opposite sides of the spade-receiving aperture 3. The extended side portions 12 and 13 merge into the transversely flat side portion 14 and 15.

In this construction the arcuate road-engaging face 11 provides an enlarged supporting surface for the tractor spade which operates to minimize the sinking of the tractor in soft earth or mud and to materially diminish the injuring of surfaces over which the tractor may be driven. The heel portions 11ª of the road-engaging face 11 are sufficiently arcuate to provide a rolling, initial engagement with the road surface.

This form of tractor lug is peculiarly adapted to provide a very powerful tractive purchase upon earth, in that the heel portions 11ª assist in packing soft earth against the edges of the tread area and the side 12 of the lug as well as the heel, thereby providing a strong tractive purchase for the tractor. The large tractive surface of the tread area 11 also provides ample traction on hard surfaced roads.

Figure 3:
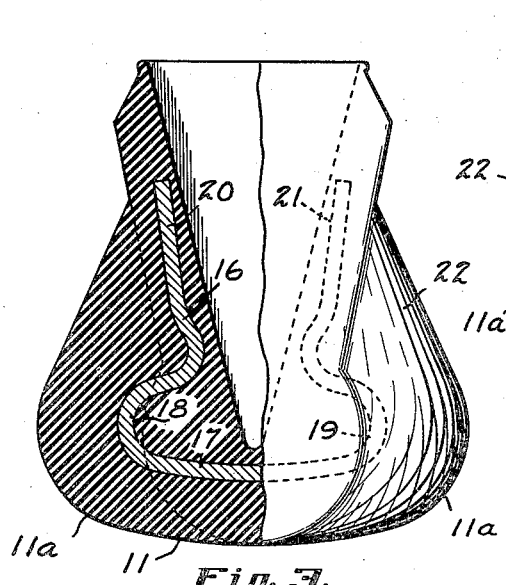
Fig. 3 is an end elevational view, partly cut away, of another form of improved tractor lug.
Figure 4:
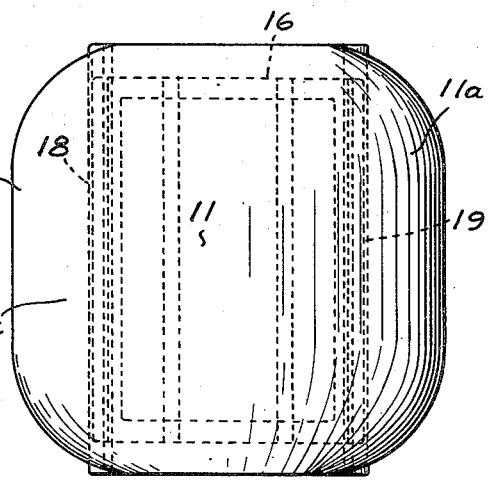
Fig. 4 is a bottom view looking upwardly from below the tractor lug shown in Fig. 3.

The form of cushioning lug shown in Figs. 3 and 4 consists in a stress-distributing metal insert 16 formed of heavy gauge metal having a broad, arcuate base portion 17 and sharply curved strengthening portions 18 and 19 interposed between the base portions 17 and parallel or slightly flared side portions 20 and 21. The metal insert 16 is also suitably plated to provide a strong bond upon vulcanization with a rubber body portion 22.

The wide, arcuate base portion 17 of the metal insert 16 serves to more effectively support the nose portions 11ª of the rubber body. The thickness of the rubber body outwardly of the base portion is substantially the same over the road-contacting area to more adequately distribute the stresses imposed on the road-contacting area. The body portion 22 of the lug is of substantially the same shape as that shown in Figs. 1 and 2 and it has the same functional characteristics.

Either forms of lugs shown herein may be quickly and easily mounted upon tractor spades by driving the lugs partly on the spades, then starting the tractor, whereupon the weight of the tractor completely seats the lug over the tractor spade.

In practice, it is found that the resilience of the rubber body portion of the tractor lug and the rubber-to-metal contact between the surface of the spade and the rubber surface within the spade-receiving apertures 3 and 29 of the lug may be depended upon to retain a lug upon a spade for all usual forms of service.

For unusual service, any of the securing means shown in my copending application may be used in connection with the tractor lugs here shown.

It is to be understood that the particular embodiments of the invention shown and described herein are presented for purposes of illustration and explanation and that various modifications in the particular shape of the lug and in the material from which either the body portion of the lug or the metal insert positioned therein may be made without departing from the invention as defined in the appended claims.

What I claim is:

1. A lug for tractor spades comprising a rigid stress-distributing insert, a resilient body portion completely enclosing said rigid insert and serving to releasably secure said lug to said spade, an arcuate tractional area forming the major road-engaging surface of said body portion, and a heel portion having a substantially spherical surface forming each lateral extremity of said tractional area and merging into said traction area and said body portion.

2. A lug for tractor spades comprising a metal insert, a substantially flat portion forming a part of said metal insert, substantially semi-cylindrical portions forming a part of said metal insert and positioned upon opposite sides of said flat portion, and a rubber composition body portion completely enclosing said metal insert, ground-engaging heel portions of said rubber composition body portion of substantially semi-cylindrical shape and overlying said semi-cylindrical portions of said metal insert, and a tractional area of said rubber composition body portion underlying the lower portion of said metal insert.

3. A lug for tractor spades comprising a metal insert having a substantially flat portion, semi-cylindrical portions forming a part of said metal insert and disposed upon laterally opposite sides of the substantially flat portion thereof, and a rubber composition body portion enclosing said metal insert, said rubber composition comprising heel portions overlying the semi-cylindrical portion of said metal insert, and a tractional portion underlying the flat portion of said metal insert and of substantially uniform thickness with said heel portions, whereby driving and tractional stresses imparted to the metal insert are delivered through the tractional portion and the heel portions of the body portion along lines of force that are substantially normal to the surface of the semi-cylindrical portions and the flat portions of said metal insert.

GEORGE R. CUNNINGTON.